(12) United States Patent
Jiang et al.

(10) Patent No.: US 9,463,990 B2
(45) Date of Patent: Oct. 11, 2016

(54) WATER TREATMENT AGENT FOR REMOVING CONTAMINANT THROUGH OXIDATION WITH HIGHLY-ACTIVE MANGANESE (V) INTERMEDIATE

(75) Inventors: Jin Jiang, Harbin (CN); Suyan Pang, Harbin (CN); Jun Ma, Harbin (CN)

(73) Assignee: Harbin Institute of Technology, Harbin, Heilongjiang Province (CN)

( * ) Notice: Subject to any disclaimer, the term of this patent is extended or adjusted under 35 U.S.C. 154(b) by 321 days.

(21) Appl. No.: 14/007,200

(22) PCT Filed: Mar. 21, 2012

(86) PCT No.: PCT/CN2012/072664
§ 371 (c)(1),
(2), (4) Date: Sep. 24, 2013

(87) PCT Pub. No.: WO2012/126357
PCT Pub. Date: Sep. 27, 2012

(65) Prior Publication Data
US 2014/0021401 A1 Jan. 23, 2014

(30) Foreign Application Priority Data
Mar. 24, 2011 (CN) .......................... 2011 1 0072090

(51) Int. Cl.
| C02F 1/72 | (2006.01) |
| C02F 1/52 | (2006.01) |
| C02F 1/68 | (2006.01) |
| C02F 101/30 | (2006.01) |

(52) U.S. Cl.
CPC ................. *C02F 1/72* (2013.01); *C02F 1/722* (2013.01); *C02F 1/5236* (2013.01); *C02F 1/683* (2013.01); *C02F 2101/30* (2013.01); *C02F 2101/306* (2013.01)

(58) Field of Classification Search
None
See application file for complete search history.

(56) References Cited

U.S. PATENT DOCUMENTS

| 3,873,362 | A | * | 3/1975 | Mihram | ................. | G21F 9/004 134/13 |
| 8,858,827 | B2 | * | 10/2014 | Ma | .......................... | C02F 1/683 252/175 |
| 2005/0026444 | A1 | * | 2/2005 | Babu | ........................ | C09G 1/02 438/697 |
| 2007/0043159 | A1 | * | 2/2007 | Bardman | .............. | C08F 265/06 524/501 |
| 2007/0043230 | A1 | * | 2/2007 | Jha | ............................ | C09G 1/02 556/57 |
| 2011/0260098 | A1 | * | 10/2011 | Ma | .......................... | C02F 1/683 252/181 |
| 2014/0021401 | A1 | * | 1/2014 | Jiang | ....................... | C02F 1/722 252/181 |

* cited by examiner

*Primary Examiner* — Joseph D Anthony
(74) *Attorney, Agent, or Firm* — Novoclaims Patent Services LLC; Mei Lin Wong

(57) ABSTRACT

A water treatment agent for removing contaminants through oxidation with high-activity intermediate-state pentavalent manganese consists of a manganese-containing compound, a complexing agent, and a persulfate, wherein the manganese-containing compound is bivalent manganese ions, permanganate or manganese dioxide. The molar ratio of the bivalent manganese ions, the ligand, and the persulfate is 1:1-50:1-1000. The agent removes contaminants through oxidation with high-activity intermediate-state pentavalent manganese, and has the advantages of high oxidizing ability, being capable of fast removing organic contaminants in water, and having no toxic and harmful substance produced.

20 Claims, 1 Drawing Sheet

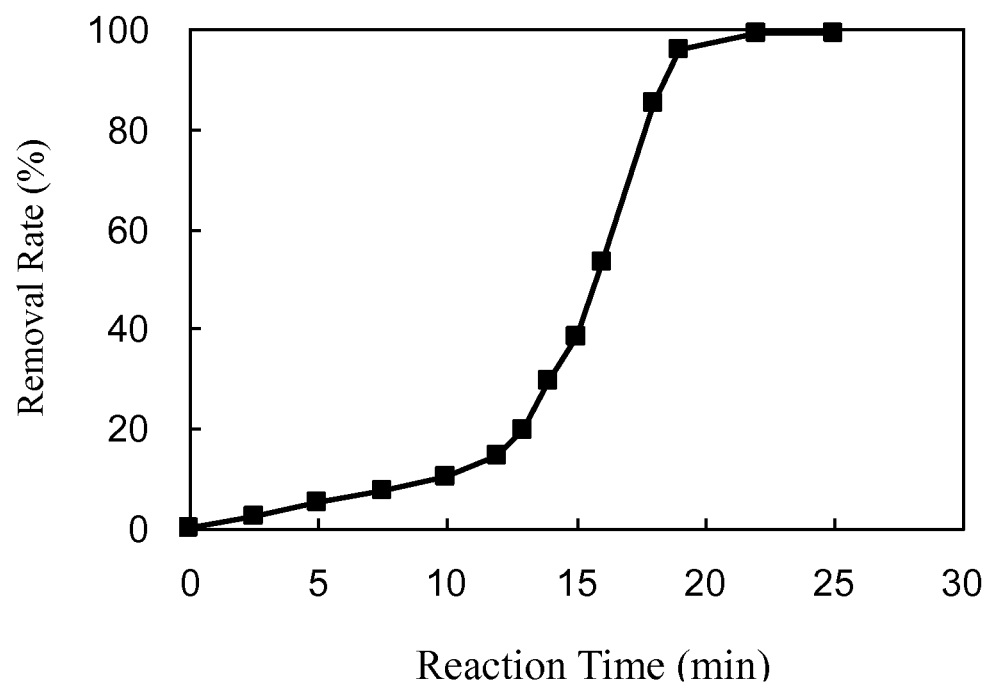

WATER TREATMENT AGENT FOR REMOVING CONTAMINANT THROUGH OXIDATION WITH HIGHLY-ACTIVE MANGANESE (V) INTERMEDIATE

CROSS REFERENCE OF RELATED APPLICATION

This is a national phase national application of an international patent application number PCT/CN2012/072664 with a filing date of Mar. 21, 2012, which claimed priority of a foreign application number 201110072090.1 with a filing date of Mar. 24, 2011 in China. The contents of these specifications, including any intervening amendments thereto, are incorporated herein by reference.

BACKGROUND OF THE PRESENT INVENTION

1. Field of Invention

The present invention relates to a water treatment agent which removes contaminant through oxidation process.

2. Description of Related Arts

With rapid industrial and agriculture development, a large amount of toxic and hazardous organic pollutants which are difficult to degrade are discharged into the water system, thus causing serious pollution problems to the surface water source and the groundwater source and continuous deterioration of water quality. At present, chemical oxidants such as chlorine, chlorine dioxide, hydrogen peroxide, ozone and potassium permanganate are utilized to remove organic pollutants in water through oxidation process. Ozone has high oxidation ability and high adaptability to water quality, but the investment cost and the operation cost are very high and the formation of bromate which is carcinogenic is problematic. Although hydrogen peroxide does not have high oxidation property by itself, hydroxyl radicals of strong oxidation property will be formed by reaction with ferrous ion under acid conditions. The resulting hydroxyl radical has very strong oxidation ability but the pH value of water subject to treatment has to be monitored and adjusted continuously during the reaction process, thus the process is too complicated and difficult to control. Chlorine dioxide has a very strong disinfection capability. However, the use of chlorine dioxide will lead to the formation of byproduct chlorite through reaction with organic substances in which chlorite has damaging effect to red blood cell and therefore the use of chlorine dioxide has safety hazards issues. Chlorine has certain level of oxidation capability in treating organic substances and has been used in pre-oxidation for water treatment for a long period of time. However, a series of halogenated by-products, which is hazardous to health, are formed through reactions between chlorine and different organic contaminants in water. Accordingly, the use of chlorine in pre-oxidation process of water treatment is restricted. Potassium permanganate has a relatively strong oxidizing ability on the removal of organic pollutants in water and does not produce toxic and hazardous by-products, however, organic substances have very high level of and therefore only organic substances with unsaturated functional group, such as olefin and phenolic compounds, can be oxidized and removed. The toxic and hazardous pollutants which is difficult to degrade has a very low reaction activity with potassium permanganate and therefore the removal rate is not high. Accordingly, further research and development on a water treatment agent which has strong oxidation capability and no production of toxic and hazardous by-products is required.

SUMMARY OF THE PRESENT INVENTION

An object of the present invention is to provide water treatment agent for removing contaminants through oxidation with highly active manganese (V) intermediate which solves the problems of low oxidation ability and production of toxic and hazardous by-products of existing chemicals (such as chlorine, chlorine dioxide, hydrogen peroxide, ozone and potassium permanganate) used in water treatment.

The water treatment agent for removing contaminants through oxidation with highly active manganese (V) intermediate according to the first preferred embodiment of the present invention is composed of bivalent manganese ions, ligand and persulfate, wherein a molar ratio of the bivalent manganese ions, the ligand, and the persulfate is 1:(1-50):(1-1000). The bivalent manganese ions is obtained from at least one of the group consisting of manganese chloride, manganese sulfate and manganese nitrate.

The water treatment agent for removing contaminants through oxidation with highly active manganese (V) intermediate according to the second preferred embodiment of the present invention is composed of permanganate, ligand and persulfate, wherein a molar ratio of the permanganate, the ligand, and the persulfate is 1:(1-50):(1-1000). The permanganate is potassium permanganate and/or sodium permanganate.

The water treatment agent for removing contaminants through oxidation with highly active manganese (V) intermediate according to the third preferred embodiment of the present invention is composed of manganese dioxide, ligand and persulfate, wherein a molar ratio of the manganese dioxide, the ligand, and the persulfate is 1:(1-50):(1-1000).

In the water treatment agent for removing contaminants through oxidation with highly active manganese (V) intermediate according to the first, the second and the third preferred embodiment of the present invention, the persulfate is peroxomonosulfate ($MHSO_5$, M=K, Na or $NH_4$) and/or peroxodisulfate ($A_2S_2O_8$, A=K, Na or $NH_4$); the ligand is inorganic ligand, low molecular weight carboxylic acid, amino acid, aminoxatyl ligand, high molecular weight carboxylic acid or organic phosphonic acid.

Advantageous Effect

In the presence of ligand, the rapid and in situ reaction between bivalent manganese ions, permanganate or manganese dioxide and persulfate can result in the producing of highly active manganese (V) intermediate. The highly active manganese (V) intermediate produced from in situ reaction has strong oxidizing activity which is capable of removing the organic pollutants in water at a faster rate while no toxic and harmful by-products are produced.

The principle of highly active manganese (V) intermediate production is explained by using bivalent manganese ions, ligand and peroxomonosulfate as the example of illustration as follows:

In the presence of ligand (Ligand, L), peroxomonosulfate ($HSO_5^-$) is catalyzed by Mn(II) to produce trivalent manganese (Mn(III)L) and sulfate radical ($SO_4^-$), which is shown in Reaction (1); then the Mn(III)L from Reaction (I) reacts with peroxomonosulfate ($HSO_5^-$) in which two-electron transfer process in oxygen is occurred, then highly active manganese (V) intermediate (Mn(V)L) and sulfate ($SO_4^-$) are produced, which is shown in Reaction (2). The Mn(V)L can be reduced to Mn(III)L in the process of oxidation and degradation of organic substances, then the Mn(III)L can catalyze the peroxomonosulfate ($HSO_5^-$) to produce Mn(V)L and $SO_4^-$ and the reaction can be carried out continuously.

$$Mn(II)+HSO_5^-+L \rightarrow Mn(III)L+SO_4^- \quad \text{Reaction (1)}$$

$$Mn(III)L+HSO_5^- \rightarrow Mn(V)L+SO_4^{2-} \quad \text{Reaction (2)}$$

The water treatment agent of the present invention can be used for processing source water, polluted water or secondary effluent from sewage plant and meet the corresponding national standards.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 1 is a graph showing the relationship between the removal rate of atrazine and the HRT according to exemplary embodiment 21 of a preferred embodiment of the present invention.

DETAILED DESCRIPTION OF THE PREFERRED EMBODIMENT

The preferred embodiment of the present invention is further described and includes all combinations and modifications encompassed within the spirit and scope of the followings.

Exemplary Embodiment 1

The water treatment agent for removing contaminants through oxidation with highly active manganese (V) intermediate according to the first preferred embodiment of the present invention is composed of bivalent manganese ions, ligand and persulfate, wherein a molar ratio of the bivalent manganese ions, the ligand, and the persulfate is 1:(1-50):(1-1000).

According to this preferred embodiment of the present invention, the bivalent manganese ions, the ligand and the persulfate are stored separately. The bivalent manganese ions can be stored in solid state compound or liquid state ions.

According to this preferred embodiment of the present invention, in the presence of ligand, the rapid and in situ reaction between bivalent manganese ions and persulfate can result in the producing of highly active manganese (V) intermediate. The highly active manganese (V) intermediate produced from in situ reaction has strong oxidizing activity which is capable of removing the organic pollutants in water at a faster rate while no toxic and harmful by-products are produced.

According to this preferred embodiment of the present invention, a water treatment method which utilizes the water treatment agent for removing contaminants through oxidation with highly active manganese (V) intermediate comprises the following steps: (a) adding bivalent manganese ions and ligand into the water subject to treatment and mixing uniformly, then adding persulfate and maintaining a concentration of bivalent manganese ions at 0.5~100 μmol/L, where a molar ratio of the bivalent manganese ions, the ligand, and the persulfate is 1:(1-50):(1-1000) and a hydraulic retention time is 1~180 min; (b) carrying out routine water treatment process, which includes coagulation processing, sedimentation processing and filtration processing. In the step (a), the water subject to treatment is source water, polluted water or secondary effluent from sewage plant.

According to this preferred embodiment of the present invention, in the presence of ligand (Ligand, L), peroxomonosulfate ($HSO_5^-$) is catalyzed by Mn(II) to produce trivalent manganese (Mn(III)L) and sulfate radical ($SO_4^-$), which is shown in Reaction (1); then the Mn(III)L from Reaction (I) reacts with peroxomonosulfate ($HSO_5^-$) in which two-electron transfer process in oxygen is occurred, then highly active manganese (V) intermediate (Mn(V)L) and sulfate ($SO_4^-$) are produced, which is shown in Reaction (2). The Mn(V)L can be reduced to Mn(III)L in the process of oxidation and degradation of organic substances, then the Mn(III)L can catalyze the peroxomonosulfate ($HSO_5^-$) to produce Mn(V)L and $SO_4^-$ and the reaction can be carried out continuously.

$$Mn(II)+HSO_5^-+L \rightarrow Mn(III)L+SO_4^- \quad \text{Reaction (1)}$$

$$Mn(III)L+HSO_5^- \rightarrow Mn(V)L+SO_4^{2-} \quad \text{Reaction (2)}$$

Exemplary Embodiment 2

The difference between this embodiment and the exemplary embodiment 1 is that a molar ratio of the bivalent manganese ions, the ligand, and the persulfate is 1:(2-40):(5-800). Other parameters and conditions are the same as that of the exemplary embodiment 1.

Exemplary Embodiment 3

The difference between this embodiment and the exemplary embodiment 1 is that a molar ratio of the bivalent manganese ions, the ligand, and the persulfate is 1:(3-30):(10-600). Other parameters and conditions are the same as that of the exemplary embodiment 1.

Exemplary Embodiment 4

The difference between this embodiment and the exemplary embodiment 1 is that a molar ratio of the bivalent manganese ions, the ligand, and the persulfate is 1:(5-20):(15-400). Other parameters and conditions are the same as that of the exemplary embodiment 1.

Exemplary Embodiment 5

The difference between this embodiment and the exemplary embodiment 1 is that a molar ratio of the bivalent manganese ions, the ligand, and the persulfate is 1:(6-15):(20-200). Other parameters and conditions are the same as that of the exemplary embodiment 1.

Exemplary Embodiment 6

The difference between this embodiment and the exemplary embodiment 1 is that a molar ratio of the bivalent manganese ions, the ligand, and the persulfate is 1:(7-10):

(25-100). Other parameters and conditions are the same as that of the exemplary embodiment 1.

Exemplary Embodiment 7

The difference between this embodiment and the exemplary embodiment 1 is that a molar ratio of the bivalent manganese ions, the ligand, and the persulfate is 1:8.3:30. Other parameters and conditions are the same as that of the exemplary embodiment 1.

Exemplary Embodiment 8

The difference between this embodiment and the exemplary embodiments 1 to 7 is that. the bivalent manganese ions is selected from at least one of the group consisting of manganese chloride, manganese sulfate and manganese nitrate. Other parameters and conditions are the same as that of one of the exemplary embodiments 1 to 7.

According to this exemplary embodiment, if the bivalent manganese ions is a mixture from two or more of the manganese chloride, the manganese sulfate and the manganese nitrate, the ratio of different components in the mixture is not restricted.

Exemplary Embodiment 9

The difference between this embodiment and the exemplary embodiments 1 to 8 is that the ligand is inorganic ligand, low molecular weight carboxylic acid, amino acid, aminoxatyl ligand, high molecular weight carboxylic acid or organic phosphonic acid. Other parameters and conditions are the same as that of one of the exemplary embodiments 1 to 8.

Exemplary Embodiment 10

The difference between this embodiment and the exemplary embodiment 9 is that inorganic ligand is one or more of the group selected from phosphate, pyrophosphate and polyphosphates. Other parameters and conditions are the same as that of one of the exemplary embodiment 9.

According to this exemplary embodiment, if the inorganic ligand is a mixture from two or more of the phosphate, the pyrophosphate and the polyphosphates, the ratio of different components in the mixture is not restricted.

Exemplary Embodiment 11

The difference between this embodiment and the exemplary embodiment 9 is that the low molecular weight carboxylic acid is one or more of the group selected from oxalic acid, citric acid, tartaric acid, malonic acid, succinic acid, benzoic acid, salicylic acid, phthalic acid, sulfosalicylic acid, maleic acid, fumaric acid, gallic acid and tannic acid. Other parameters and conditions are the same as that of one of the exemplary embodiment 9.

According to this exemplary embodiment, if the low molecular weight carboxylic acid is a mixture containing two or more components, the ratio of different components in the mixture is not restricted.

Exemplary Embodiment 12

The difference between this embodiment and the exemplary embodiment 9 is that the aminoxatyl ligand is one or more of the group selected from ethylenediaminetetraacetic acid (EDTA), cyclohexanediamine tetraacetic acid (CDTA), nitrilotriacetic acid (NTA), ethylene glycol bis-aminoethylether tetraacetic acid (EGTA), ethylenediaminetetrapropionic acid, triethylenetetramine, Ethylenediamine-N,N'-disuccinic acid (EDDS), pentetic acid (DTPA), tris (phosphonomethyl)amine (ATMP) and ethylenediamine tetra(methylene phosphonic acid) (EDTMP). Other parameters and conditions are the same as that of one of the exemplary embodiment 9.

According to this exemplary embodiment, if the aminoxatyl ligand is a mixture containing two or more components, the ratio of different components in the mixture is not restricted.

Exemplary Embodiment 13

The difference between this embodiment and the exemplary embodiment 9 is that the high molecular weight carboxylic acid is one or more of the group selected from humic acid, fulvic acid and alginic acid. Other parameters and conditions are the same as that of one of the exemplary embodiment 9.

According to this exemplary embodiment, if the high molecular weight carboxylic acid is a mixture containing two or more components, the ratio of different components in the mixture is not restricted.

Exemplary Embodiment 14

The difference between this embodiment and the exemplary embodiment 9 is that the organic phosphonic acid is one or more of the group selected from hydroxyethylidene diphosphonic acid (1-Hydroxy Ethylidene-1,1-Diphosphonic Acid), 1-aminoethylene diphosphonic acid, amino trimethylene phosphonic acid, ethylene diamine tetra (methylene phosphonic Acid), 2-phosphonobutane-1,2,4-tricarboxylic acid, diethylene triamine penta (methylene phosphonic acid), hexamethylenediamine tetra(methylene phosphonic acid), glycine dimethyl phosphonic acid, dimethylamine phosphonic acid, hydroxy-trimethylene phosphonic acid, sodium 1,1'-diphosphono propionyloxy phosphonate, polyether methylene phosphonate, and phosphono polyacrylic acid. Other parameters and conditions are the same as that of one of the exemplary embodiment 9.

According to this exemplary embodiment, if the organic phosphonic acid is a mixture containing two or more components, the ratio of different components in the mixture is not restricted.

Exemplary Embodiment 15

The difference between this embodiment and the exemplary embodiments 1 to 14 is that the persulfate is peroxomonosulfate $MHSO_5$, where M equals to K, Na or $NH_4$; or peroxodisulfate $A_2S_2O_8$, where A equals to K, Na or $NH_4$. Other parameters and conditions are the same as that of one of the exemplary embodiments 1 to 14.

Exemplary Embodiment 16

The water treatment agent for removing contaminants through oxidation with highly active manganese (V) intermediate according to the second preferred embodiment of the present invention, the difference between this embodiment and the exemplary embodiments 1 to 15 is that permanganate is used instead of the bivalent manganese ions. Other parameters and conditions are the same as that of one of the exemplary embodiments 1 to 15.

According to this preferred embodiment of the present invention, in the presence of ligand, trivalent manganese is produced through reaction between permanganate and pollutants in the water subject to treatment, and the rapid and in situ reaction between trivalent manganese and persulfate can result in the producing of highly active manganese (V) intermediate. The highly active manganese (V) intermediate production from in situ reaction has strong oxidizing activity which is capable of removing the organic pollutants in water at a faster rate while no toxic and harmful by-products are produced.

According to this preferred embodiment of the present invention, a water treatment method which utilizes the water treatment agent for removing contaminants through oxidation with highly active manganese (V) intermediate comprises the following steps: (a) adding permanganate and ligand into the water subject to treatment and mixing uniformly, then adding persulfate and maintaining a concentration of permanganate at 0.5~100 µmol/L, where a molar ratio of the permanganate, the ligand, and the persulfate is 1:(1-50):(1-1000) and a hydraulic retention time is 1~180 min; (b) carrying out routine water treatment process, which includes coagulation processing, sedimentation processing and filtration processing. In the step (a), the water subject to treatment is source water, polluted water or secondary effluent from sewage plant.

Exemplary Embodiment 17

The difference between this embodiment and the exemplary embodiment 16 is that the permanganate is potassium permanganate and/or sodium permanganate. Other parameters and conditions are the same as that of one of the exemplary embodiment 16.

According to this exemplary embodiment, if the permanganate is a mixture of potassium permanganate and sodium permanganate, the ratio of different components in the mixture is not restricted.

Exemplary Embodiment 18

The water treatment agent for removing contaminants through oxidation with highly active manganese (V) intermediate according to the third preferred embodiment of the present invention, the difference between this embodiment and the exemplary embodiments 1 to 15 is that manganese dioxide is used instead of the bivalent manganese ions. Other parameters and conditions are the same as that of one of the exemplary embodiments 1 to 15.

According to this preferred embodiment of the present invention, in the presence of ligand, bivalent or trivalent manganese is produced through reaction between manganese dioxide and pollutants in the water subject to treatment, and the rapid and in situ reaction between bivalent or trivalent manganese and persulfate can result in the producing of highly active manganese (V) intermediate. The highly active manganese (V) intermediate produced from in situ reaction has strong oxidizing activity which is capable of removing the organic pollutants in water at a faster rate while no toxic and harmful by-products are produced.

According to this preferred embodiment of the present invention, a water treatment method which utilizes the water treatment agent for removing contaminants through oxidation with highly active manganese (V) intermediate comprises the following steps: (a) adding manganese dioxide and ligand into the water subject to treatment and mixing uniformly, then adding persulfate and maintaining a concentration of manganese dioxide at 0.5~100 µmol/L, where a molar ratio of the manganese dioxide, the ligand, and the persulfate is 1:(1-50):(1-1000) and a hydraulic retention time is 1~180 min; (b) carrying out routine water treatment process, which includes coagulation processing, sedimentation processing and filtration processing. In the step (a), the water subject to treatment is source water, polluted water or secondary effluent from sewage plant.

Exemplary Embodiment 19

The water treatment agent for removing contaminants through oxidation with highly active manganese (V) intermediate according to this embodiment is composed of bivalent manganese ions, ethylenediaminetetraacetic acid (EDTA) as ligand and peroxomonosulfate, wherein a molar ratio of the bivalent manganese ions and the ligand is 1:8.3 and a molar ratio of the bivalent manganese ions and the peroxomonosulfate is 1:30, wherein the bivalent manganese ions is selected from at least one of the group consisting of manganese chloride, manganese sulfate and manganese nitrate, wherein the peroxomonosulfate is $MHSO_5$, where M equals to K, Na or $NH_4$.

According to this exemplary embodiment, if the bivalent manganese ions is a mixture containing different components, the ratio of different components in the mixture is not restricted.

According to this preferred embodiment of the present invention, EDTA is used as the ligand, bivalent manganese complex is formed by the EDTA and the bivalent manganese ions which is then undergone the rapid and in situ reaction with the peroxomonosulfate to produce the highly active manganese (V) intermediate. The highly active manganese (V) intermediate produced from the in situ reaction has strong oxidizing activity which is capable of removing the organic pollutants in water at a faster rate while no toxic and harmful by-products are produced.

According to this preferred embodiment of the present invention, a water treatment process which utilizes the water treatment agent for removing contaminants through oxidation with highly active manganese (V) intermediate in which the water subject to treatment contains 10 µmol/L atrazine comprises the following steps: (a) adding the water treatment agent according to this embodiment into the water subject to treatment which contains 10 µmol/L atrazine, and maintaining a concentration of EDTA at 167 µmol/L, a concentration of bivalent manganese ions at 20 µmol/L and a concentration of peroxomonosulfate at 600 µmol/L, where a hydraulic retention time is 25 min; (b) carrying out routine water treatment process, which includes coagulation processing, sedimentation processing and filtration processing. After the water treatment process, the removal rate of atrazine is above 95%, and the relationship between the removal rate of atrazine and the hydraulic retention time is shown in FIG. 1 of the drawings.

Exemplary Embodiment 20

The water treatment agent for removing contaminants through oxidation with highly active manganese (V) intermediate according to this embodiment is composed of bivalent manganese ions, hydroxy ethylidene diphosphonic acid (HEDP) as ligand and peroxomonosulfate, wherein a molar ratio of the bivalent manganese ions and the ligand is 1:5 and a molar ratio of the bivalent manganese ions and the peroxomonosulfate is 1:50, wherein the bivalent manganese ions is selected from at least one of the group consisting of manganese chloride, manganese sulfate and manganese nitrate, wherein the peroxomonosulfate is $MHSO_5$, where M equals to K, Na or $NH_4$.

According to this exemplary embodiment, if the bivalent manganese ions is a mixture containing different components, the ratio of different components in the mixture is not restricted.

According to this preferred embodiment of the present invention, hydroxy ethylidene diphosphonic acid (organic phosphonic acid) is used as the ligand, bivalent manganese complex is formed by the hydroxy ethylidene diphosphonic acid and the bivalent manganese ions which is then undergone the rapid and in situ reaction with the peroxomonosulfate to produce the highly active manganese (V) intermediate. The highly active manganese (V) intermediate produced from the in situ reaction has strong oxidizing activity which is capable of removing the organic pollutants in water at a faster rate while no toxic and harmful by-products are produced.

According to this preferred embodiment of the present invention, a water treatment process which utilizes the water treatment agent for removing contaminants through oxidation with highly active manganese (V) intermediate in which the water subject to treatment contains 10 μmol/L atrazine comprises the following steps: (a) adding the water treatment agent according to this embodiment into the water subject to treatment which contains 10 μmol/L atrazine, and maintaining a concentration of bivalent manganese ions at 20 μmol/L, a concentration of peroxomonosulfate at 1000 μmol/L and a concentration of hydroxy ethylidene diphosphonic acid at 100 μmol/L, where a hydraulic retention time is 30 min; (b) carrying out routine water treatment process, which includes coagulation processing, sedimentation processing and filtration processing. After the water treatment process, the removal rate of atrazine is above 96%.

Exemplary Embodiment 21

The water treatment agent for removing contaminants through oxidation with highly active manganese (V) intermediate according to this embodiment is composed of bivalent manganese ions, nitrilotriacetic acid (NTA) as ligand and peroxomonosulfate, wherein a molar ratio of the bivalent manganese ions and the ligand is 1:5 and a molar ratio of the bivalent manganese ions and the peroxomonosulfate is 1:50, wherein the bivalent manganese ions is selected from at least one of the group consisting of manganese chloride, manganese sulfate and manganese nitrate, wherein the peroxomonosulfate is $KHSO_5$.

According to this exemplary embodiment, if the bivalent manganese ions is a mixture containing different components, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 20 μmol/L nitrophenol comprises the following steps: (a) adding the water treatment agent according to this embodiment into the water subject to treatment which contains 20 μmol/L nitrophenol, and maintaining a concentration of bivalent manganese ions at 20 μmol/L, a concentration of peroxomonosulfate at 1000 μmol/L and a concentration of NTA at 100 μmol/L, where a hydraulic retention time is 30 min; (b) carrying out routine water treatment process, which includes coagulation processing, sedimentation processing and filtration processing. After the water treatment process, the removal rate of nitrophenol is above 95%.

Exemplary Embodiment 22

The water treatment agent for removing contaminants through oxidation with highly active manganese (V) intermediate according to this embodiment is composed of bivalent manganese ions, citric acid as ligand and peroxomonosulfate, wherein a molar ratio of the bivalent manganese ions and the ligand is 1:25 and a molar ratio of the bivalent manganese ions and the peroxomonosulfate is 1:50, wherein the bivalent manganese ions is selected from at least one of the group consisting of manganese chloride, manganese sulfate and manganese nitrate, wherein the peroxomonosulfate is $KHSO_5$.

According to this exemplary embodiment, if the bivalent manganese ions is a mixture containing different components, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 20 μmol/L nitrophenol comprises the following steps: (a) adding the water treatment agent according to this embodiment into the water subject to treatment which contains 20 μmol/L nitrophenol, and maintaining a concentration of bivalent manganese ions at 20 μmol/L, a concentration of peroxomonosulfate at 1000 μmol/L and a concentration of citric acid at 500 μmol/L, where a hydraulic retention time is 60 min; (b) carrying out routine water treatment process, which includes coagulation processing, sedimentation processing and filtration processing. After the water treatment process, the removal rate of nitrophenol is above 90%.

Exemplary Embodiment 23

The water treatment agent for removing contaminants through oxidation with highly active manganese (V) intermediate according to this embodiment is composed of bivalent manganese ions, alginic acid as ligand and peroxomonosulfate, wherein a molar ratio of the bivalent manganese ions and the ligand is 1:10 and a molar ratio of the bivalent manganese ions and the peroxomonosulfate is 1:30, wherein the bivalent manganese ions is selected from at least one of the group consisting of manganese chloride, manganese sulfate and manganese nitrate, wherein the peroxomonosulfate is $KHSO_5$.

According to this exemplary embodiment, if the bivalent manganese ions is a mixture containing different components, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 20 μmol/L dimethyl phthalate comprises the following steps: (a) adding the water treatment agent according to this embodiment into the water subject to treatment which contains 20 μmol/L dimethyl phthalate, and maintaining a concentration of bivalent manganese ions at 10 μmol/L, a concentration of peroxomonosulfate at 30 μmol/L and a concentration of alginic acid at 100 µmol/L, where a hydraulic retention time is 60 min; (b) carrying out routine water treatment process, which includes coagulation processing, sedimentation processing and filtration processing. After the water treatment process, the removal rate of dimethyl phthalate is above 90%.

Exemplary Embodiment 24

The water treatment agent for removing contaminants through oxidation with highly active manganese (V) intermediate according to this embodiment is composed of bivalent manganese ions, 1-aminoethylene diphosphonic acid as ligand and peroxomonosulfate, wherein a molar ratio of the bivalent manganese ions and the ligand is 1:10 and a molar ratio of the bivalent manganese ions and the peroxomonosulfate is 1:100, wherein the bivalent manganese ions is selected from at least one of the group consisting of manganese chloride, manganese sulfate and manganese nitrate, wherein the peroxomonosulfate is $KHSO_5$.

According to this exemplary embodiment, if the bivalent manganese ions is a mixture containing different components, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 20 µmol/L dimethyl phthalate comprises the following steps: (a) adding the water treatment agent according to this embodiment into the water subject to treatment which contains 20 µmol/L dimethyl phthalate, and maintaining a concentration of bivalent manganese ions at 20 µmol/L, a concentration of peroxomonosulfate at 2000 µmol/L and a concentration of 1-aminoethylene diphosphonic acid at 200 µmol/L, where a hydraulic retention time is 50 min; (b) carrying out routine water treatment process, which includes coagulation processing, sedimentation processing and filtration processing. After the water treatment process, the removal rate of dimethyl phthalate is above 90%.

Exemplary Embodiment 25

The water treatment agent for removing contaminants through oxidation with highly active manganese (V) intermediate according to this embodiment is composed of bivalent manganese ions, cyclohexanediamine tetraacetic acid (CDTA) as ligand and peroxomonosulfate, wherein a molar ratio of the bivalent manganese ions and the ligand is 1:25 and a molar ratio of the bivalent manganese ions and the peroxomonosulfate is 1:100, wherein the bivalent manganese ions is selected from at least one of the group consisting of manganese chloride, manganese sulfate and manganese nitrate, wherein the peroxomonosulfate is $KHSO_5$.

According to this exemplary embodiment, if the bivalent manganese ions is a mixture containing different components, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 20 µmol/L phenol comprises the following steps: (a) adding the water treatment agent according to this embodiment into the water subject to treatment which contains 20 µmol/L phenol, and maintaining a concentration of bivalent manganese ions at 10 µmol/L, a concentration of peroxomonosulfate at 1000 µmol/L and a concentration of cyclohexanediamine tetraacetic acid at 250 µmol/L, where a hydraulic retention time is 60 min; (b) carrying out routine water treatment process, which includes coagulation processing, sedimentation processing and filtration processing. After the water treatment process, the removal rate of phenol is above 96%.

Exemplary Embodiment 26

The water treatment agent for removing contaminants through oxidation with highly active manganese (V) intermediate according to this embodiment is composed of bivalent manganese ions, pentetic acid (DTPA) as ligand and peroxomonosulfate, wherein a molar ratio of the bivalent manganese ions and the ligand is 1:1 and a molar ratio of the bivalent manganese ions and the peroxomonosulfate is 1:10, wherein the bivalent manganese ions is selected from at least one of the group consisting of manganese chloride, manganese sulfate and manganese nitrate, wherein the peroxomonosulfate is $KHSO_5$.

According to this exemplary embodiment, if the bivalent manganese ions is a mixture containing different components, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 20 µmol/L phenol comprises the following steps: (a) adding the water treatment agent according to this embodiment into the water subject to treatment which contains 20 µmol/L phenol, and maintaining a concentration of bivalent manganese ions at 20 µmol/L, a concentration of peroxomonosulfate at 200 µmol/L and a concentration of pentetic acid at 250 µmol/L, where a hydraulic retention time is 60 min; (b) carrying out routine water treatment process, which includes coagulation processing, sedimentation processing and filtration processing. After the water treatment process, the removal rate of phenol is above 95%.

Exemplary Embodiment 27

The water treatment agent for removing contaminants through oxidation with highly active manganese (V) intermediate according to this embodiment is composed of bivalent manganese ions, hydroxy ethylidene diphosphonic acid as ligand and peroxomonosulfate, wherein a molar ratio of the bivalent manganese ions and the ligand is 1:40 and a molar ratio of the bivalent manganese ions and the peroxomonosulfate is 1:800, wherein the bivalent manganese ions is selected from at least one of the group consisting of manganese chloride, manganese sulfate and manganese nitrate, wherein the peroxomonosulfate is $KHSO_5$.

According to this exemplary embodiment, if the bivalent manganese ions is a mixture containing different components, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 10 µmol/L phenol comprises the following steps: (a) adding the water treatment agent according to this embodiment into the water subject to treatment which contains 10 μmol/L phenol, and maintaining a concentration of bivalent manganese ions at 2 μmol/L, a concentration of peroxomonosulfate at 1600 μmol/L and a concentration of pentetic acid at 80 μmol/L, where a hydraulic retention time is 60 min; (b) carrying out routine water treatment process, which includes coagulation processing, sedimentation processing and filtration processing. After the water treatment process, the removal rate of phenol is above 95%.

Exemplary Embodiment 28

The water treatment agent for removing contaminants through oxidation with highly active manganese (V) intermediate according to this embodiment is composed of permanganate, nitrilotriacetic acid as ligand and peroxomonosulfate, wherein a molar ratio of the permanganate and the ligand is 1:50 and a molar ratio of the permanganate and the peroxomonosulfate is 1:1000, wherein the permanganate is potassium permanganate and/or sodium permanganate, wherein the peroxomonosulfate is $MHSO_5$, where M is K, Na or $NH_4$.

According to this exemplary embodiment, if the permanganate is a mixture of potassium permanganate and sodium permanganate, the ratio of different components in the mixture is not restricted.

According to this preferred embodiment of the present invention, nitrilotriacetic acid is used as the ligand, trivalent manganese complex is formed by the nitrilotriacetic acid and the permanganate which then undergoes the rapid and in situ reaction with the peroxomonosulfate to produce the highly active manganese (V) intermediate. The highly active manganese (V) intermediate produced from the in situ reaction has strong oxidizing activity which is capable of removing the organic pollutants in water at a faster rate while no toxic and harmful by-products are produced.

According to this preferred embodiment of the present invention, a water treatment process which utilizes the water treatment agent for removing contaminants through oxidation with highly active manganese (V) intermediate in which the water subject to treatment contains 10 μmol/L 2,4-dichlorophenol comprises the following steps: (a) adding the water treatment agent according to this embodiment into the water subject to treatment which contains 10 μmol/L 2,4-dichlorophenol, and maintaining a concentration of permanganate at 8 μmol/L, a concentration of peroxomonosulfate at 8000 μmol/L and a concentration of phosphate at 400 μmol/L, where a hydraulic retention time is 120 min; (b) carrying out routine water treatment process, which includes coagulation processing, sedimentation processing and filtration processing. After the water treatment process, the removal rate of 2,4-dichlorophenol is above 99%.

Exemplary Embodiment 29

The water treatment agent for removing contaminants through oxidation with highly active manganese (V) intermediate according to this embodiment is composed of permanganate, ethylenediaminetetraacetic acid (EDTA) as ligand and peroxomonosulfate, wherein a molar ratio of the permanganate and the ligand is 1:5 and a molar ratio of the permanganate and the peroxomonosulfate is 1:300, wherein the permanganate is potassium permanganate and/or sodium permanganate, wherein the peroxomonosulfate is MHSO5, where M is K, Na or NH4.

According to this exemplary embodiment, if the permanganate is a mixture of potassium permanganate and sodium permanganate, the ratio of different components in the mixture is not restricted.

According to this preferred embodiment of the present invention, ethylenediaminetetraacetic acid (EDTA) is used as the ligand, trivalent manganese complex is formed by reaction between the permanganate and the pollutants in the water subject to treatment which then undergoes the rapid and in situ reaction with the peroxomonosulfate to produce the highly active manganese (V) intermediate. The highly active manganese (V) intermediate produced from the in situ reaction has strong oxidizing activity which is capable of removing the organic pollutants in water at a faster rate while no toxic and harmful by-products are produced.

According to this preferred embodiment of the present invention, a water treatment process which utilizes the water treatment agent for removing contaminants through oxidation with highly active manganese (V) intermediate in which the water subject to treatment contains 20 μmol/L 2,4-dichlorophenol comprises the following steps: (a) adding the water treatment agent according to this embodiment into the water subject to treatment which contains 20 μmol/L 2,4-dichlorophenol, and maintaining a concentration of permanganate at 20 μmol/L, a concentration of peroxomonosulfate at 6000 μmol/L and a concentration of EDTA at 100 μmol/L, where a hydraulic retention time is 120 min; (b) carrying out routine water treatment process, which includes coagulation processing, sedimentation processing and filtration processing. After the water treatment process, the removal rate of 2,4-dichlorophenol is above 99%.

Exemplary Embodiment 30

The water treatment agent for removing contaminants through oxidation with highly active manganese (V) intermediate according to this embodiment is composed of permanganate, ethylenediaminetetraacetic acid (EDTA) as ligand and peroxomonosulfate, wherein a molar ratio of the permanganate and the ligand is 1:10 and a molar ratio of the permanganate and the peroxomonosulfate is 1:5, wherein the permanganate is potassium permanganate and/or sodium permanganate, wherein the peroxomonosulfate is $MHSO_5$, where M is K, Na or $NH_4$.

According to this exemplary embodiment, if the permanganate is a mixture of potassium permanganate and sodium permanganate, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 20 μmol/L 4-chlorophenol comprises the following steps: (a) adding the water treatment agent according to this embodiment into the water subject to treatment which contains 20 μmol/L 4-chlorophenol, and maintaining a concentration of permanganate at 20 μmol/L, a concentration of peroxomonosulfate at 1000 μmol/L and a concentration of EDTA at 200 μmol/L, where a hydraulic retention time is 120 min; (b) carrying out routine water treatment process, which includes coagulation processing, sedimentation processing and filtration processing. After the water treatment process, the removal rate of 4-chlorophenol is above 99%.

Exemplary Embodiment 31

The water treatment agent for removing contaminants through oxidation with highly active manganese (V) intermediate according to this embodiment is composed of permanganate, nitrilotriacetic acid (NTA) as ligand and peroxomonosulfate, wherein a molar ratio of the permanganate and the ligand is 1:2 and a molar ratio of the permanganate and the peroxomonosulfate is 1:20, wherein the permanganate is potassium permanganate and/or sodium permanganate, wherein the peroxomonosulfate is $MHSO_5$, where M is K, Na or $NH_4$.

According to this exemplary embodiment, if the permanganate is a mixture of potassium permanganate and sodium permanganate, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 10 μmol/L bisphenol A comprises the following steps: (a) adding the water treatment agent according to this embodiment into the water subject to treatment which contains 10 μmol/L bisphenol A, and maintaining a concentration of permanganate at 10 μmol/L, a concentration of peroxomonosulfate at 200 μmol/L and a concentration of EDTA at 20 μmol/L, where a hydraulic retention time is 30 min; (b) carrying out routine water treatment process, which includes coagulation processing, sedimentation processing and filtration processing. After the water treatment process, the removal rate of bisphenol A is above 98%.

Exemplary Embodiment 32

The water treatment agent for removing contaminants through oxidation with highly active manganese (V) intermediate according to this embodiment is composed of permanganate, 1-aminoethylene diphosphonic acid as ligand and peroxomonosulfate, wherein a molar ratio of the permanganate and the ligand is 1:5 and a molar ratio of the permanganate and the peroxomonosulfate is 1:50, wherein the permanganate is potassium permanganate and/or sodium permanganate, wherein the peroxomonosulfate is $MHSO_5$, where M is K, Na or $NH_4$.

According to this exemplary embodiment, if the permanganate is a mixture of potassium permanganate and sodium permanganate, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 10 μmol/L bisphenol A comprises the following steps: (a) adding the water treatment agent according to this embodiment into the water subject to treatment which contains 10 μmol/L bisphenol A, and maintaining a concentration of permanganate at 10 μmol/L, a concentration of peroxomonosulfate at 500 μmol/L and a concentration of 1-aminoethylene diphosphonic acid at 50 μmol/L, where a hydraulic retention time is 30 min; (b) carrying out routine water treatment process, which includes coagulation processing, sedimentation processing and filtration processing. After the water treatment process, the removal rate of bisphenol A is above 98%.

Exemplary Embodiment 33

The water treatment agent for removing contaminants through oxidation with highly active manganese (V) intermediate according to this embodiment is composed of permanganate, citric acid as ligand and peroxomonosulfate, wherein a molar ratio of the permanganate and the ligand is 1:20 and a molar ratio of the permanganate and the peroxomonosulfate is 1:200, wherein the permanganate is potassium permanganate and/or sodium permanganate, wherein the peroxomonosulfate is $MHSO_5$, where M is K, Na or $NH_4$.

According to this exemplary embodiment, if the permanganate is a mixture of potassium permanganate and sodium permanganate, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 10 μmol/L bisphenol A comprises the following steps: (a) adding the water treatment agent according to this embodiment into the water subject to treatment which contains 10 μmol/L bisphenol A, and maintaining a concentration of permanganate at 5 μmol/L, a concentration of peroxomonosulfate at 1000 μmol/L and a concentration of citric acid at 100 μmol/L, where a hydraulic retention time is 30 min; (b) carrying out routine water treatment process, which includes coagulation processing, sedimentation processing and filtration processing. After the water treatment process, the removal rate of bisphenol A is above 98%.

Exemplary Embodiment 34

The water treatment agent for removing contaminants through oxidation with highly active manganese (V) intermediate according to this embodiment is composed of permanganate, phosphate as ligand and peroxomonosulfate, wherein a molar ratio of the permanganate and the ligand is 1:5 and a molar ratio of the permanganate and the peroxomonosulfate is 1:20, wherein the permanganate is potassium permanganate and/or sodium permanganate, wherein the peroxomonosulfate is $MHSO_5$, where M is K, Na or $NH_4$.

According to this exemplary embodiment, if the permanganate is a mixture of potassium permanganate and sodium permanganate, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 10 μmol/L phenol comprises the following steps: (a) adding the water treatment agent according to this embodiment into the water subject to treatment which contains 10 μmol/L phenol, and maintaining a concentration of permanganate at 50 μmol/L, a concentration of peroxomonosulfate at 1000 μmol/L and a concentration of phosphate at 250 μmol/L, where a hydraulic retention time is 180 min; (b) carrying out routine water treatment process, which includes coagulation processing, sedimentation processing and filtration processing. After the water treatment process, the removal rate of phenol is above 98%

Exemplary Embodiment 35

The water treatment agent for removing contaminants through oxidation with highly active manganese (V) intermediate according to this embodiment is composed of permanganate, pyrophosphate as ligand and peroxomonosulfate, wherein a molar ratio of the permanganate and the ligand is 1:5 and a molar ratio of the permanganate and the peroxomonosulfate is 1:20, wherein the permanganate is potassium permanganate and/or sodium permanganate, wherein the peroxomonosulfate is MHSO$_5$, where M is K, Na or NH$_4$.

According to this exemplary embodiment, if the permanganate is a mixture of potassium permanganate and sodium permanganate, the ratio of different components in the mixture is not restricted.

According to this preferred embodiment of the present invention, a water treatment process which utilizes the water treatment agent for removing contaminants through oxidation with highly active manganese (V) intermediate in which the water subject to treatment contains 5 μmol/L phenol comprises the following steps: (a) adding the water treatment agent according to this embodiment into the water subject to treatment which contains 5 μmol/L phenol, and maintaining a concentration of permanganate at 5 μmol/L, a concentration of peroxomonosulfate at 100 μmol/L and a concentration of pyrophosphate at 25 μmol/L, where a hydraulic retention time is 30 min; (b) carrying out routine water treatment process, which includes coagulation processing, sedimentation processing and filtration processing. After the water treatment process, the removal rate of phenol is above 98%.

Exemplary Embodiment 36

The water treatment agent for removing contaminants through oxidation with highly active manganese (V) intermediate according to this embodiment is composed of manganese dioxide, ethylenediaminetetraacetic acid (EDTA) as ligand and peroxomonosulfate, wherein a molar ratio of the manganese dioxide and the ligand is 1:10 and a molar ratio of the manganese dioxide and the peroxomonosulfate is 1:10, wherein the peroxomonosulfate is MHSO$_5$, where M is K, Na or NH$_4$.

According to this preferred embodiment of the present invention, in the presence of ethylenediaminetetraacetic acid (EDTA) as ligand, bivalent or trivalent manganese is produced through reaction between manganese dioxide and pollutants in the water subject to treatment, and the rapid and in situ reaction between the bivalent or the trivalent manganese and peroxomonosulfate can result in the production of highly active manganese (V) intermediate. The highly active manganese (V) intermediate produced from the in situ reaction has strong oxidizing activity which is capable of removing the organic pollutants in water at a faster rate while no toxic and harmful by-products are produced.

According to this preferred embodiment of the present invention, a water treatment process which utilizes the water treatment agent for removing contaminants through oxidation with highly active manganese (V) intermediate in which the water subject to treatment contains 5 μmol/L bisphenol A comprises the following steps: (a) adding the water treatment agent according to this embodiment into the water subject to treatment which contains 5 μmol/L bisphenol A, and maintaining a concentration of manganese dioxide at 60 μmol/L, a concentration of peroxomonosulfate at 600 μmol/L and a concentration of EDTA at 60 μmol/L, where a hydraulic retention time is 180 min; (b) carrying out routine water treatment process, which includes coagulation processing, sedimentation processing and filtration processing. After the water treatment process, the removal rate of bisphenol A is above 99%.

Exemplary Embodiment 37

The water treatment agent for removing contaminants through oxidation with highly active manganese (V) intermediate according to this embodiment is composed of manganese dioxide, hydroxy ethylidene diphosphonic acid as ligand and peroxomonosulfate, wherein a molar ratio of the manganese dioxide and the ligand is 1:5 and a molar ratio of the manganese dioxide and the peroxomonosulfate is 1:20, wherein the peroxomonosulfate is NaHSO$_5$.

According to this preferred embodiment of the present invention, a water treatment process which utilizes the water treatment agent for removing contaminants through oxidation with highly active manganese (V) intermediate in which the water subject to treatment contains 10 μmol/L bisphenol A comprises the following steps: (a) adding the water treatment agent according to this embodiment into the water subject to treatment which contains 10 μmol/L bisphenol A, and maintaining a concentration of manganese dioxide at 60 μmol/L, a concentration of peroxomonosulfate at 1200 μmol/L and a concentration of hydroxy ethylidene diphosphonic acid at 600 μmol/L, where a hydraulic retention time is 180 min; (b) carrying out routine water treatment process, which includes coagulation processing, sedimentation processing and filtration processing. After the water treatment process, the removal rate of bisphenol A is above 99%.

Exemplary Embodiment 38

The water treatment agent for removing contaminants through oxidation with highly active manganese (V) intermediate according to this embodiment is composed of manganese dioxide, polyphosphates as ligand and peroxomonosulfate, wherein a molar ratio of the manganese dioxide and the ligand is 1:5 and a molar ratio of the manganese dioxide and the peroxomonosulfate is 1:50, wherein the peroxomonosulfate is NaHSO$_5$.

According to this preferred embodiment of the present invention, the polyphosphates is potassium tripolyphosphate.

According to this preferred embodiment of the present invention, a water treatment process which utilizes the water treatment agent for removing contaminants through oxidation with highly active manganese (V) intermediate in which the water subject to treatment contains 10 μmol/L bisphenol A comprises the following steps: (a) adding the water treatment agent according to this embodiment into the water subject to treatment which contains 10 μmol/L bisphenol A, and maintaining a concentration of manganese dioxide at 60 μmol/L, a concentration of peroxomonosulfate at 3000 μmol/L and a concentration of polyphosphates at 300 μmol/L, where a hydraulic retention time is 180 min; (b) carrying out routine water treatment process, which includes coagulation processing, sedimentation processing and filtration processing. After the water treatment process, the removal rate of bisphenol A is above 99%.

Exemplary Embodiment 39

The water treatment agent for removing contaminants through oxidation with highly active manganese (V) intermediate according to this embodiment is composed of manganese dioxide, malonic acid as ligand and peroxomonosulfate, wherein a molar ratio of the manganese dioxide and the ligand is 1:20 and a molar ratio of the manganese dioxide and the peroxomonosulfate is 1:100, wherein the peroxomonosulfate is NaHSO$_5$. According to this preferred embodiment of the present invention, a water treatment process which utilizes the water treatment agent for removing contaminants through oxidation with highly active manganese (V) intermediate in which the water subject to treatment contains 10 μmol/L bisphenol A comprises the following steps: (a) adding the water treatment agent according to this embodiment into the water subject to treatment which contains 10 μmol/L bisphenol A, and maintaining a concentration of manganese dioxide at 30 μmol/L, a concentration of peroxomonosulfate at 3000 μmol/L and a concentration of malonic acid at 600 μmol/L, where a hydraulic retention time is 180 min; (b) carrying out routine water treatment process, which includes coagulation processing, sedimentation processing and filtration processing. After the water treatment process, the removal rate of bisphenol A is above 99%.

Exemplary Embodiment 40

The water treatment agent for removing contaminants through oxidation with highly active manganese (V) intermediate according to this embodiment is composed of manganese dioxide, ethylenediaminetetrapropionic acid as ligand and peroxomonosulfate, wherein a molar ratio of the manganese dioxide and the ligand is 1:5 and a molar ratio of the manganese dioxide and the peroxomonosulfate is 1:500, wherein the peroxomonosulfate is NaHSO$_5$.

According to this preferred embodiment of the present invention, a water treatment process which utilizes the water treatment agent for removing contaminants through oxidation with highly active manganese (V) intermediate in which the water subject to treatment contains 10 μmol/L bisphenol A comprises the following steps: (a) adding the water treatment agent according to this embodiment into the water subject to treatment which contains 10 μmol/L bisphenol A, and maintaining a concentration of manganese dioxide at 50 μmol/L, a concentration of peroxomonosulfate at 25000 μmol/L and a concentration of ethylenediaminetetrapropionic acid at 250 μmol/L, where a hydraulic retention time is 180 min; (b) carrying out routine water treatment process, which includes coagulation processing, sedimentation processing and filtration processing. After the water treatment process, the removal rate of bisphenol A is above 99%.

Exemplary Embodiment 41

The water treatment agent for removing contaminants through oxidation with highly active manganese (V) intermediate according to this embodiment is composed of manganese dioxide, oxalic acid as ligand and peroxomonosulfate, wherein a molar ratio of the manganese dioxide and the ligand is 1:40 and a molar ratio of the manganese dioxide and the peroxomonosulfate is 1:800, wherein the peroxomonosulfate is NaHSO$_5$.

According to this preferred embodiment of the present invention, a water treatment process which utilizes the water treatment agent for removing contaminants through oxidation with highly active manganese (V) intermediate in which the water subject to treatment contains 10 μmol/L bisphenol A comprises the following steps: (a) adding the water treatment agent according to this embodiment into the water subject to treatment which contains 10 μmol/L bisphenol A, and maintaining a concentration of manganese dioxide at 5 μmol/L, a concentration of peroxomonosulfate at 4000 μmol/L and a concentration of oxalic acid at 200 μmol/L, where a hydraulic retention time is 180 min; (b) carrying out routine water treatment process, which includes coagulation processing, sedimentation processing and filtration processing. After the water treatment process, the removal rate of bisphenol A is above 99%.

Exemplary Embodiment 42

The water treatment agent for removing contaminants through oxidation with highly active manganese (V) intermediate according to this embodiment is composed of manganese dioxide, citric acid as ligand and peroxomonosulfate, wherein a molar ratio of the manganese dioxide and the ligand is 1:50 and a molar ratio of the manganese dioxide and the peroxomonosulfate is 1:1000, wherein the peroxomonosulfate is NaHSO$_5$.

According to this preferred embodiment of the present invention, a water treatment process which utilizes the water treatment agent for removing contaminants through oxidation with highly active manganese (V) intermediate in which the water subject to treatment contains 10 μmol/L bisphenol A comprises the following steps: (a) adding the water treatment agent according to this embodiment into the water subject to treatment which contains 10 μmol/L bisphenol A, and maintaining a concentration of manganese dioxide at 5 μmol/L, a concentration of peroxomonosulfate at 5000 μmol/L and a concentration of citric acid at 250 μmol/L, where a hydraulic retention time is 180 min; (b) carrying out routine water treatment process, which includes coagulation processing, sedimentation processing and filtration processing. After the water treatment process, the removal rate of bisphenol A is above 99%.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A water treatment agent that utilizes highly active manganese (V) intermediate, characterized in that: said water treatment agent is composed of bivalent manganese ions, a ligand and persulfate, wherein a molar ratio of the bivalent manganese ions, the ligand, and the persulfate is 1:1-50:1-1000.

2. The water treatment agent according to claim 1, wherein the ligand is selected from the group consisting of inorganic ligand, low molecular weight carboxylic acid, amino acid, aminoxatyl ligand, high molecular weight carboxylic acid and organic phosphonic acid.

3. The water treatment agent according to claim 2, wherein the inorganic ligand is selected from one or more of the group consisting of phosphate, pyrophosphate and polyphosphates.

4. The water treatment agent according to claim 2, wherein the low molecular weight carboxylic acid is selected from one or more of the group consisting of oxalic acid, citric acid, tartaric acid, malonic acid, succinic acid, benzoic acid, salicylic acid, phthalic acid, sulfosalicylic acid, maleic acid, fumaric acid, gallic acid and tannic acid.

5. The water treatment agent according to claim 2, wherein the aminoxatyl ligand is selected from one or more of the group consisting of ethylenediaminetetraacetic acid, cyclohexanediamine tetraacetic acid, nitrilotriacetic acid, ethylene glycol bis-aminoethylether tetraacetic acid, ethylenediaminetetrapropionic acid, triethylenetetramine, ethylenediamine-N,N'-disuccinic acid, pentetic acid, tris(phosphonomethyl)amine and ethylenediamine tetra(methylene phosphonic acid).

6. The water treatment agent according to claim 2, wherein the high molecular weight carboxylic acid is selected from one or more of the group consisting of humic acid, fulvic acid and alginic acid.

7. The water treatment agent according to claim 2, wherein the organic phosphonic acid is selected from one or more of the group consisting of hydroxyethylidene diphosphonic acid, 1-aminoethylene diphosphonic acid, amino trimethylene phosphonic acid, ethylene diamine tetra (methylene phosphonic Acid), 2-phosphonobutane-1,2,4-tricarboxylic acid, diethylene triamine penta (methylene phosphonic acid), hexamethylenediamine tetra(methylene phosphonic acid), glycine dimethyl phosphonic acid, dimethylamine phosphonic acid, hydroxy-trimethylene phosphonic acid, sodium 1,1'-diphosphono propionyloxy phosphonate, polyether methylene phosphonate, and phosphono polyacrylic acid.

8. The water treatment agent according to claim 1, wherein the persulfate is peroxomonosulfate or peroxodisulfate, wherein the peroxomonosulfate is $MHSO_5$, where M equals to K, Na or $NH_4$, wherein the peroxodisulfate is $A_2S_2O_8$, where A equals to K, Na or $NH_4$.

9. A water treatment agent that utilizes highly active manganese (V) intermediate, characterized in that: said water treatment agent is composed of permanganate, a ligand and persulfate, wherein a molar ratio of the permanganate, the ligand, and the persulfate is 1:1-50:1-1000.

10. The water treatment agent according to claim 9, wherein the ligand is selected from the group consisting of inorganic ligand, low molecular weight carboxylic acid, amino acid, aminoxatyl ligand, high molecular weight carboxylic acid and organic phosphonic acid.

11. The water treatment agent according to claim 10, wherein the inorganic ligand is selected from one or more of the group consisting of phosphate, pyrophosphate and polyphosphates.

12. The water treatment agent according to claim 10, wherein the aminoxatyl ligand is selected from one or more of the group consisting of ethylenediaminetetraacetic acid, cyclohexanediamine tetraacetic acid, nitrilotriacetic acid, ethylene glycol bis-aminoethylether tetraacetic acid, ethylenediaminetetrapropionic acid, triethylenetetramine, ethylenediamine-N,N'-disuccinic acid, pentetic acid, tris(phosphonomethyl)amine and ethylenediamine tetra(methylene phosphonic acid).

13. The water treatment agent according to claim 10, wherein the high molecular weight carboxylic acid is selected from one or more of the group consisting of humic acid, fulvic acid and alginic acid.

14. The water treatment agent according to claim 9, wherein the persulfate is peroxomonosulfate or peroxodisulfate, wherein the peroxomonosulfate is $MHSO_5$, where M equals to K, Na or $NH_4$, wherein the peroxodisulfate is $A_2S_2O_8$, where A equals to K, Na or $NH_4$.

15. A water treatment agent that utilizes highly active manganese (V) intermediate, characterized in that: said water treatment agent is composed of manganese dioxide, a ligand and persulfate, wherein a molar ratio of the permanganate, the ligand, and the persulfate is 1:1-50:1-1000.

16. The water treatment agent according to claim 15, wherein the ligand is selected from the group consisting of inorganic ligand, low molecular weight carboxylic acid, amino acid, aminoxatyl ligand, high molecular weight carboxylic acid and organic phosphonic acid.

17. The water treatment agent according to claim 16, wherein the inorganic ligand is selected from one or more of the group consisting of phosphate, pyrophosphate and polyphosphates.

18. The water treatment agent according to claim 16, wherein the aminoxatyl ligand is selected from one or more of the group consisting of ethylenediaminetetraacetic acid, cyclohexanediamine tetraacetic acid, nitrilotriacetic acid, ethylene glycol bis-aminoethylether tetraacetic acid, ethylenediaminetetrapropionic acid, triethylenetetramine, ethylenediamine-N,N'-disuccinic acid, pentetic acid, tris(phosphonomethyl)amine and ethylenediamine tetra(methylene phosphonic acid).

19. The water treatment agent according to claim 16, wherein the high molecular weight carboxylic acid is selected from one or more of the group consisting of humic acid, fulvic acid and alginic acid.

20. The water treatment agent according to claim 15, wherein the persulfate is peroxomonosulfate or peroxodisulfate, wherein the peroxomonosulfate is $MHSO_5$, where M equals to K, Na or $NH_4$, wherein the peroxodisulfate is $A_2S_2O_8$, where A equals to K, Na or $NH_4$.

* * * * *